United States Patent
Bourgois et al.

(10) Patent No.: US 9,765,970 B2
(45) Date of Patent: Sep. 19, 2017

(54) AIRCRAFT TURBOMACHINE COMBUSTION CHAMBER MODULE AND METHOD FOR DESIGNING SAME

(71) Applicant: Safran Aircraft Engines, Paris (FR)

(72) Inventors: Sebastien Alain Christophe Bourgois, Moissy-Cramayel (FR); Jean-Francois Cabre, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 331 days.

(21) Appl. No.: 14/353,966

(22) PCT Filed: Oct. 24, 2012

(86) PCT No.: PCT/FR2012/052442
§ 371 (c)(1),
(2) Date: Apr. 24, 2014

(87) PCT Pub. No.: WO2013/060985
PCT Pub. Date: May 2, 2013

(65) Prior Publication Data
US 2015/0285500 A1    Oct. 8, 2015

(30) Foreign Application Priority Data
Oct. 25, 2011    (FR) ..................... 11 59635

(51) Int. Cl.
*F02C 1/00*    (2006.01)
*F23R 3/28*    (2006.01)
(Continued)

(52) U.S. Cl.
CPC .................. *F23R 3/28* (2013.01); *F02C 3/14* (2013.01); *F02C 7/22* (2013.01); *F23R 3/06* (2013.01);
(Continued)

(58) Field of Classification Search
CPC .... F23R 3/04; F23R 3/06; F23R 2900/03041; F23R 3/50
See application file for complete search history.

(56) References Cited

U.S. PATENT DOCUMENTS

2002/0116929 A1*  8/2002  Snyder .................... F23R 3/002
                                                         60/740
2005/0034459 A1*  2/2005  McMasters ............. F23R 3/002
                                                         60/752
(Continued)

FOREIGN PATENT DOCUMENTS

EP    1 632 720    3/2006
EP    1 777 458    4/2007

OTHER PUBLICATIONS

U.S. Appl. No. 14/609,533, filed Jan. 30, 2015, Berton, et al.
(Continued)

*Primary Examiner* — Gerald L Sung
(74) *Attorney, Agent, or Firm* — Oblon, McClelland, Maier & Neustadt, L.L.P.

(57) ABSTRACT

A combustion chamber module for an aircraft turbomachine, including an annular combustion chamber in which each of primary and dilution ports of an outer annular wall, which is located at least partly in a wake of a fuel injector, has a discharge coefficient higher than that of its homologous port of an inner annular wall. A method for designing such a module includes determining wakes generated by fuel injectors, and then geometrically defining air inlet ports of coaxial walls of the combustion chamber such that an air flow rate actually entering through ports of the outer wall is substantially equal to an air flow rate entering through ports of the inner wall.

8 Claims, 4 Drawing Sheets (51) Int. Cl.
  *F23R 3/06*   (2006.01)
  *F23R 3/14*   (2006.01)
  *F23R 3/50*   (2006.01)
  *F02C 3/14*   (2006.01)
  *F02C 7/22*   (2006.01)

(52) U.S. Cl.
  CPC ............ *F23R 3/14* (2013.01); *F23R 3/50* (2013.01); *Y02T 50/675* (2013.01)

(56) References Cited

U.S. PATENT DOCUMENTS

| | | | |
|---|---|---|---|
| 2006/0042254 A1* | 3/2006 | Yoshida | F23D 11/104 60/740 |
| 2006/0059918 A1 | 3/2006 | Caldwell et al. | |
| 2006/0272335 A1* | 12/2006 | Schumacher | F23R 3/12 60/804 |
| 2007/0084219 A1 | 4/2007 | Bernier et al. | |
| 2009/0084110 A1 | 4/2009 | Dudebout et al. | |
| 2009/0139239 A1* | 6/2009 | Zupanc | F23R 3/06 60/740 |

OTHER PUBLICATIONS

International Search Report issued Jan. 3, 2013, in PCT/FR12/052442, filed Oct. 24, 2012.
French Search Report issued Jun. 12, 2012 in FR 1159635 filed Oct. 25, 2011.

* cited by examiner

AIRCRAFT TURBOMACHINE COMBUSTION CHAMBER MODULE AND METHOD FOR DESIGNING SAME

TECHNICAL FIELD

The present invention relates to the field of turbomachines, such as aircraft turbomachines, and more particularly relates to the annular combustion chamber modules of the turbomachines as well as methods for designing such modules

STATE OF PRIOR ART

The turbomachines comprise at least one turbine arranged at the outlet of a combustion chamber to extract energy of a primary flow of gases ejected by this combustion chamber and drive a compressor provided upstream of the combustion chamber and feeding pressurized air to this chamber.

An annular combustion chamber of a turbomachine is generally accommodated in an annular enclosure and particularly comprises two coaxial annular walls, respectively a radially inner wall and a radially outer wall, which extend from upstream to downstream, along the general flow direction of the primary gas flow in the turbomachine, about the axis of the combustion chamber, and which are connected to each other at their upstream end by a chamber bottom annular wall which substantially radially extends about the aforementioned axis. This chamber bottom annular wall is equipped with an annular row of injection systems evenly distributed about this axis to allow air and fuel delivery into the combustion chamber.

Injection systems generally comprise means for supporting fuel injector heads extending in the aforementioned enclosure and distributed about the axis of the combustion chamber. These supporting means are usually provided with aerodynamic means for injecting air and vaporizing fuel as fine droplets into the combustion chamber.

Generally, the combustion chambers are comprised of an upstream inner region, commonly called primary zone, and a downstream inner region, commonly called dilution zone.

The primary zone of a combustion chamber is provided for the combustion of the air and fuel mixture in substantially stoichiometric proportions. To that end, air is injected into this zone not only by the injection systems but also by first ports, commonly called primary ports, provided in the annular walls of the chamber about the primary zone of the latter.

The dilution zone is provided for diluting and cooling gases from the combustion in the primary zone, and for providing the flow of these gases with an optimum thermal profile for its passage through the turbine mounted downstream of the combustion chamber. For this, the annular walls of the combustion chamber include second air inlet ports, commonly called dilution ports.

The performance of a combustion chamber depends in particular on the air distribution from the primary ports and the dilution ports within the combustion chamber.

It is thus desirable to optimize this air distribution.

DISCLOSURE OF THE INVENTION

One object of the invention in particular is to improve the distribution of air from the primary ports and the dilution ports within a combustion chamber, in a simple, economical and efficient way.

To that end, it provides a combustion chamber module for an aircraft turbomachine, comprising:
  an annular enclosure,
  a plurality of fuel injectors distributed about a longitudinal axis of a combustion chamber and extending inside said enclosure,
  an annular combustion chamber accommodated in said enclosure and including a chamber bottom annular wall equipped with injection systems respectively connected to the fuel injectors, as well as two respectively inner and outer coaxial annular walls, connected to each other by the chamber bottom wall and each including a plurality of respectively inner and outer air inlet ports, arranged in the form of at least one annular row, such that each outer port is centred with respect to a median axial plane of a corresponding inner port, called homologous port of said outer port.

By median axial plane, it is of course meant a plane passing through the axis of the combustion chamber and going through a centre region of the inner port considered. Such a plane preferably forms a symmetry plane for this inner port.

Said module is provided for receiving an air flow from a turbomachine compressor generally flowing from upstream to downstream of the combustion chamber within said enclosure and:
  a first part of which is destined to penetrate the combustion chamber through the chamber bottom wall,
  a second part of which is destined to bypass the combustion chamber by passing along the radially inner wall thereof,
  a third part aims at bypassing the combustion chamber by running between said injectors, which thus each create a respective wake, and by running along the radially outer wall of the combustion chamber.

According to the invention, each of the outer ports which is located at least partly in the wake of one of the injectors, has a discharge coefficient higher than that of its homologous inner port.

The discharge coefficient reflects the ability of ports to let the air pass under a given load. This coefficient is proportional to the cross-section of the ports but also depends on the geometry thereof.

It is to be noted that several definitions of discharge coefficients are commonly used which differ by the units used. The coefficient considered herein is for example the experimental coefficient Kv defined by the French standard NF E 29312 as being equal to the water flow rate in liter per minute passing through the port under a pressure loss of 1 bar with a fully open passage. Any other definition is however usable in the scope of the invention given that only a comparison between discharge coefficients of the same type is required for the definition of the invention.

Generally, the invention enables the pressure loss inherent to the wakes of injectors in the air flow bypassing the combustion chamber radially outwardly to be compensated for, and thus offers a better homogeneity of the air in the combustion chamber.

The increase level in the discharge coefficient of the outer ports located in wakes is preferably between 2% and 5% of the discharge coefficient of the respective homologous inner ports of these outer ports.

Advantageously, each of the outer ports which are located at least partly in the wake of one of the injectors has a cross-section having an area higher than that of its homologous inner port.

The increase level in the cross-section of the outer ports located in wakes is preferably between 2% and 5% of the cross-section of the respective homologous inner ports of these outer ports.

Alternatively or complementarily, the outer ports located in the wakes may have a flanged edge.

Further, for each of said outer ports located at least partly in the wake of one of the injectors, the ratio of the discharge coefficient of said port to the discharge coefficient of a consecutive outer port located out of the aforementioned wake is higher than the ratio of the discharge coefficient of the inner port homologous of said outer port located in the wake to the discharge coefficient of the inner port homologous of said consecutive outer port located out of said wake.

In a manner known per se, the outer air inlet ports are preferably arranged in the form of two annular rows, so as to form primary ports and dilution ports respectively.

In this case, the ratio of the discharge coefficient of each of the outer primary ports located at least partly in the wake of one of the injectors to the discharge coefficient of the homologous inner primary port is advantageously higher than the ratio of the discharge coefficient of each of the outer dilution ports located at least partly in the wake of one of said injectors to the discharge coefficient of the homologous inner dilution port.

This enables the discharge coefficients of the outer ports to be best suited to the profile of the wakes, which profile generally lessens in the downstream direction.

In a first preferred embodiment of the invention, each of the outer ports which has a discharge coefficient higher than that of the homologous inner port, is intercepted by an axial plane passing through a fuel emitting centre axis of the corresponding injector.

By corresponding injector, it is of course meant the injector which generates the wake wherein the considered outer port is located.

The combustion chamber module according to this first embodiment of the invention is particularly advantageous when it equips a turbomachine comprising an axial type compressor, or more generally when the air flow feeding this module is devoid of spinning component.

In this case, the corresponding injector is simply the closest injector to the outer port considered.

In a second preferred embodiment of the invention, each of the outer ports which has a discharge coefficient higher than that of the homologous inner port is fully apart from an axial plane passing through a fuel emitting centre axis of the corresponding injector.

The combustion chamber module according to this second embodiment of the invention is particularly advantageous when it equips a turbomachine comprising a centrifugal type compressor, or more generally when the air flow feeding this module has a spinning component.

The invention also relates to a turbomachine for an aircraft comprising a combustion chamber module of the type described above.

In the first embodiment of the invention, the turbomachine comprises a compressor mounted upstream of the combustion chamber module and designed to deliver to said module an air flow devoid of spinning component, and said module is in accordance with the first embodiment described above.

In the second embodiment of the invention, the turbomachine comprises a compressor mounted upstream of the combustion chamber module and designed to deliver to said module an air flow helically flowing about the longitudinal axis of the combustion chamber, and said module is in accordance with the second embodiment described above.

The invention further relates to a method for designing a combustion chamber module of the type described above for an aircraft turbomachine comprising a compressor for delivering an air flow to said module, the method comprising a step of determining wakes generated by the injectors in the aforementioned third part of the air flow, and then a step of geometrically defining the air inlet ports of the coaxial walls of the combustion chamber, wherein the outer ports located at least partly in said wakes are defined so as to have a discharge coefficient higher than that of their homologous inner ports such that the air flow rate actually entering through said outer ports is substantially equal to the air flow rate entering through said homologous inner ports.

The step of geometrically defining outer ports preferably comprises sizing a cross-section thereof having an area higher than that of the homologous inner ports.

The invention finally relates to a method for designing an aircraft turbomachine, comprising designing a combustion chamber module by means of the method of the type described above.

BRIEF DESCRIPTION OF THE DRAWINGS

The invention will be better understood, and further details, advantages and characteristics thereof will appear upon reading the following description, made by way of non-limiting example and in reference to the appended drawings wherein.

In all these figures, identical references may designate identical or analogous elements.

DETAILED DISCLOSURE OF PREFERRED EMBODIMENTS

Figure 1:
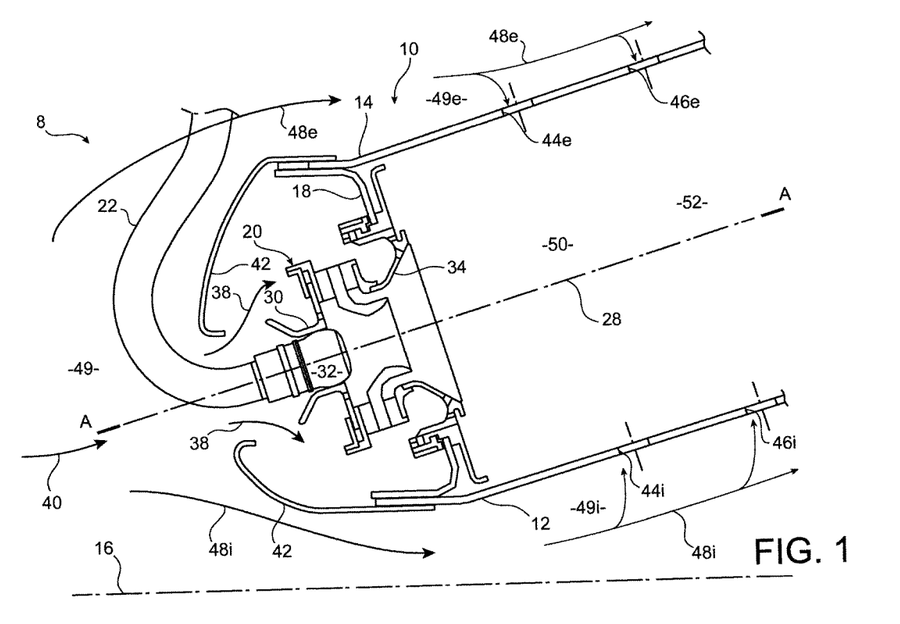
FIG. 1 is a schematic partial axial cross-section view of a combustion chamber module of a turbomachine of a first known type.

FIG. 1 represents part of a turbomachine of a known type, such as an airplane turbojet engine, and more particularly illustrates part of a module 8 of an annular combustion chamber 10 of this turbomachine.

In a well-known manner, the combustion chamber 10 is mounted downstream of a compressor of the turbomachine for feeding pressurized air to this chamber, and upstream of a turbine of this turbomachine, for rotatably driving the aforementioned compressor under the effect of the thrust of gases from the combustion chamber, this compressor and this turbine being not represented in FIG. 1.

The combustion chamber 10 comprises two respectively radially inner 12 and radially outer 14 coaxial annular walls, which extend about the longitudinal axis 16 of the combustion chamber.

Both these annular walls 12 and 14 are fastened downstream to casings of the chamber (non-visible in FIG. 1), and are connected to each other at their upstream end by a chamber bottom annular wall 18, in a known manner.

The chamber bottom annular wall 18 includes an annular row of ports evenly distributed about the axis 16 of the combustion chamber, and wherein injection systems 20 associated with an annular row of fuel injectors 22 are mounted.

Each injection system 20 has a fuel emitting axis 28 and includes, upstream, means 30 for centring and guiding a head 32 of the corresponding injector 22, and downstream, a mixing bowl 34 mounted in the corresponding port of the chamber bottom wall 18.

Each injection system 20 includes ports for injecting, into the combustion chamber, a part 38 of the air flow 40 from the turbomachine compressor.

It is to be noted that in the terminology relating to the present invention, the module 8 includes the combustion chamber 10, the fuel injectors 22, as well as the enclosure 49 wherein this chamber 10 and these injectors 22 are accommodated.

Besides, the annular walls 12 and 14 of the combustion chamber are connected at the upstream end thereof to an annular fairing 42 (FIG. 1) which is for example of the single piece type including ports aligned with the injection systems 20 for the passage of the injectors 22 and the air flow 38. The main functions of this fairing are protecting the chamber bottom wall 18 and channelizing the air flow 38. Alternatively and in a known manner, this fairing 42 can be formed by two separated annular parts, sometimes called caps.

The inner annular wall 12 of the combustion chamber 10 further includes two annular rows of inner air inlet ports 44i, 46i for injecting a part 48i of the air flow 40 into the combustion chamber. In operation, this part 48i of the air flow 40 can reach the outer ports 44i and 46i by flowing downstream in a bypassing inner annular space 49i provided between the annular wall 12 of the combustion chamber and a corresponding casing (non-visible in FIG. 1).

A first row of these rows of ports is formed around an upstream region 50 of the combustion chamber commonly called primary zone, wherein, in operation, the combustion reactions of the air and fuel mixture take place. The ports 44i of this first row are for that reason commonly called primary ports.

The second row of ports is formed downstream about a region 52 of the chamber commonly called dilution zone, wherein the combustion gases are diluted and cooled. The ports 46i of this second row are for this reason commonly called dilution ports.

Analogously, the outer annular wall 14 of the combustion chamber 10 includes two annular rows of outer primary ports 44e and outer dilution ports 46e, for injecting a part 48e of air flow 40 into the combustion chamber. In operation, this part 48e of the air flow 40 can reach these air inlet ports 44e and 46e by flowing downstream in a bypassing outer annular space 49e provided between the annular wall 14 of the combustion chamber and a corresponding casing (non-visible in FIG. 1).

It is to be noted that each outer port 44e, 46e is centred with respect to a median axial plane of a corresponding inner port 44i, 46i, which can thus be defined as being the homologous port of said outer port 44e, 46e.

In operation, the fuel injectors 22 extend through the air flow 48e which bypasses the chamber radially outwardly and create corresponding wakes within this air flow.

Figure 2:
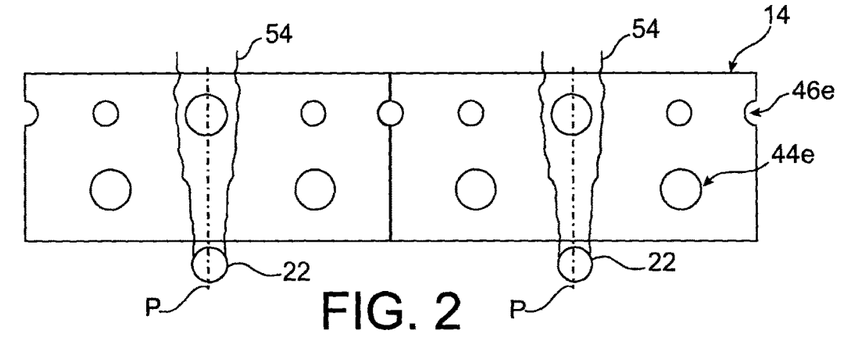
FIG. 2 is a schematic partial axial developed plane view of the outer annular wall of the combustion chamber of the module of FIG. 1.

As illustrated in FIG. 2, each of these wakes 54 is developed downstream by being centred with respect to a median axial plane P of the corresponding injector 22, in the case where the air flow 48e (FIG. 1) provided by the compressor of the turbomachine flows downstream substantially without spinning component. This can be the case when the compressor is of the axial type.

It is to be noted that by axial plane, it should be understood a plane passing through the axis 16 (FIG. 1) of the combustion chamber 10. Further, the plane P passes through the fuel emitting centre axis 28 (FIG. 1) of the injector 22.

Figure 3:
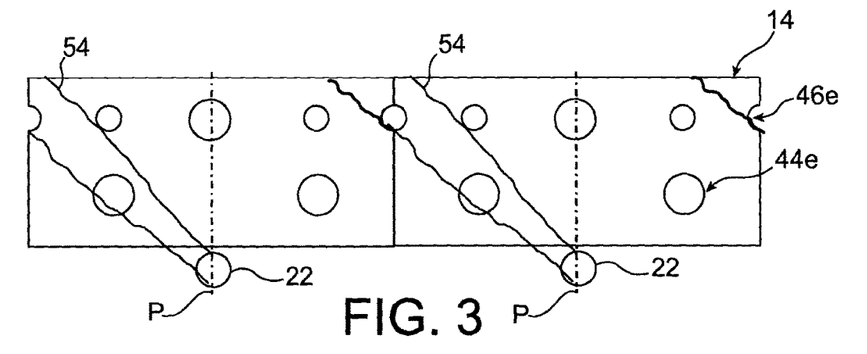
FIG. 3 is a schematic partial axial developed plane view of the outer annular wall of the combustion chamber of a combustion chamber module of a turbomachine of the second known type.

In the case illustrated in FIG. 3, where the air flow 48e provided by the compressor of the turbomachine helically flows downstream, that is with a spinning component, each of the wakes 54 is developed downstream generally along a direction tilted with respect to the median axial plane P of the corresponding injector 22. This can be the case In particular when the compressor is of the centrifugal type.

Figure 4:
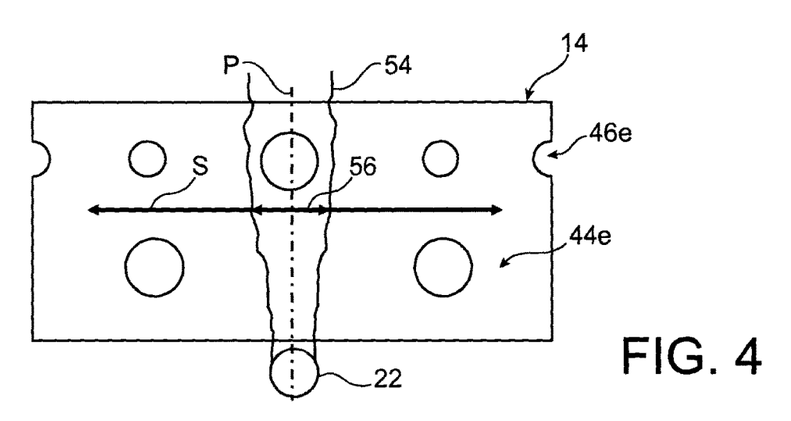
FIG. 4 is a greater scale view of a part of FIG. 2, illustrating the wake of a fuel injector along the outer annular wall of the combustion chamber.
Figure 5:
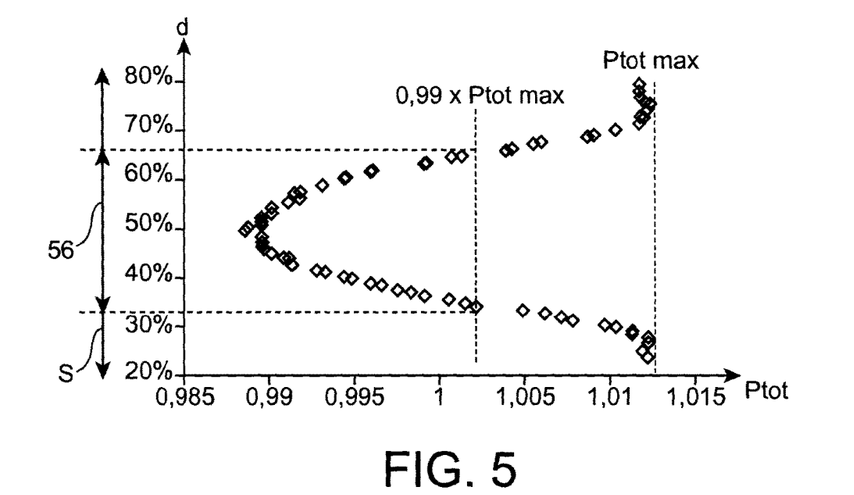
FIG. 5 is a graph representing the total pressure (in abscissa) as a function of the circumferential position (in ordinate) along the transverse segment S of FIG. 4.

FIGS. 4 and 5 illustrate a more accurate definition of a wake 54 of the injector 22. Such a wake is a depression in the region of space hidden from the air flow 48e by the injector 22. FIG. 5 represents the total pressure Ptot of the air flow 48e as a function of the position d measured along the transverse segment S of FIG. 4.

Within the scope of the present invention, for each segment S, a wake zone 56 is defined (FIG. 4) as being a zone of the segment S wherein the total pressure Ptot of the air flow 48e is lower than 99% of the maximum Ptotmax taken by this total pressure along this segment S. A wake 54 is defined as the union of contiguous wake zones 56.

Figure 6:
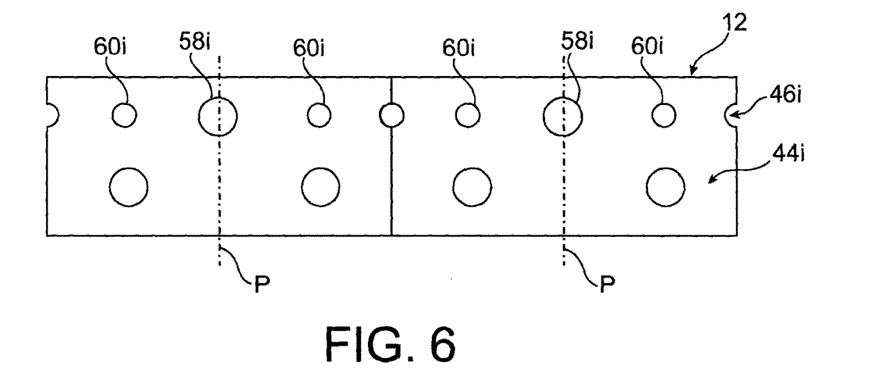
FIG. 6 is a schematic partial developed plane view of the inner annular wall of the combustion chamber of a combustion chamber module of a turbomachine according to a first preferred embodiment of the invention.
Figure 7:
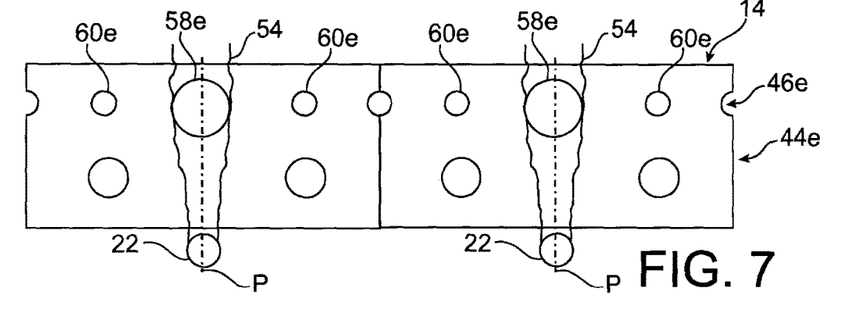
FIG. 7 is a schematic partial developed plane view of the outer annular wall of the combustion chamber of the module of FIG. 6.

FIGS. 6 and 7 respectively illustrate the inner 12 and outer 14 annular walls of a combustion chamber 10 of a combustion chamber module 8 of a turbomachine according to a first preferred embodiment of the invention, wherein the compressor of the turbomachine is of the axial type and delivers an air flow devoid of spinning component to the aforementioned module. This turbomachine is similar to that described above in reference to FIGS. 1 to 5, except for the configuration of the inner 12 and outer 14 annular walls of its combustion chamber.

In this embodiment, no outer primary port 44e is exposed to a wake 54 of the injector 22. On the other hand, the dilution port 58e which is centred with respect to the median axial plane P of each injector 22 is exposed to the wake 54 of this injector 22. This dilution port 58e (FIG. 7) has a cross-section having an area about 4% greater than that of its homologous inner port 58i (FIG. 6), such that the air flow rates respectively flowing through both these ports can be substantially equal.

In other words, the outer wall 14 of FIG. 7 differs from that of FIG. 2 in that the air inlet ports exposed to a wake 54 of the injector 22 have a cross-section having an increased area in order to compensate for the deficient air pressure defining the wake 54 and thus enabling the combustion chamber to be optimally supplied with air.

It is to be noted that the ratio of areas of the respective cross-sections of the aforementioned outer dilution port 58e, to each of the dilution ports 60e consecutive thereto, is higher than the ratio of the areas of the respective cross-sections of the homologous inner dilution port 58i, to each of the dilution ports 60i consecutive thereto.

The increase in the cross-section is an example among several configurations enabling the discharge coefficient of the primary ports exposed to an injector wake to be increased. Other methods to increase this discharge coefficient rely in particular upon a modification of the shape of ports, for example upon the use of ports having flanged edges.

Figure 8:
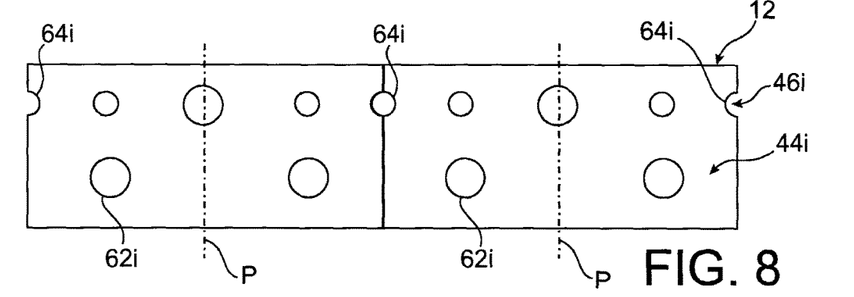
FIG. 8 is a schematic partial developed plane view of the inner annular wall of the combustion chamber of a combustion chamber module of a turbomachine according to a second preferred embodiment of the invention.
Figure 9:
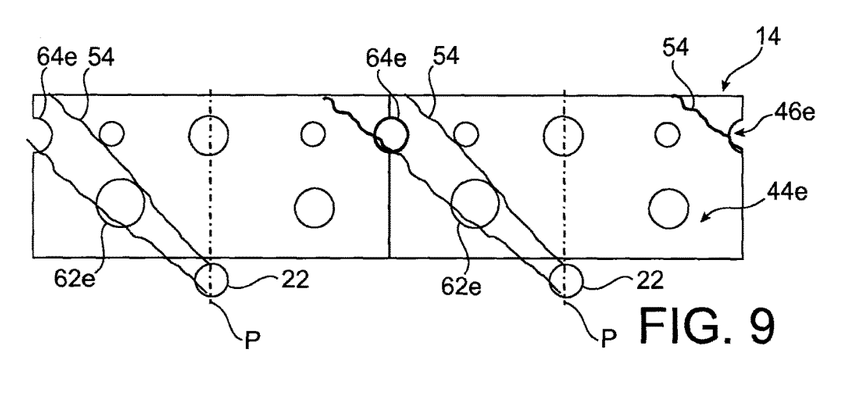
FIG. 9 is a schematic partial developed plane view of the outer annular wall of the combustion chamber of the module of FIG. 8.

FIGS. 8 and 9 respectively illustrate the inner 12 and outer 14 annular walls of a combustion chamber 10 of a combustion chamber module 8 of a turbomachine according to a second preferred embodiment of the invention, wherein the compressor of the turbomachine is of the centrifugal type and delivers an air flow having a spinning component to the aforementioned module.

In this embodiment, one outer primary port 44e out of two, referenced 62e, and one outer dilution port 46e out of four, referenced 64e, are partly exposed to a wake 54 of the injector 22 (FIG. 9). These ports 62e and 64e are spaced apart with respect to the median axial plane P of the corresponding injector 22. These ports each have a cross-section having an area greater than that of the homologous inner port 62i, 64i (FIG. 8), such that the air flow rates respectively flowing through each outer port 62e, 64e and its homologous inner port 62i, 64i can be substantially equal.

In the example illustrated, each outer dilution port 64e exposed to a wake 54 is located at an equal distance from two consecutive planes P.

The invention claimed is:

1. A method for designing a turbomachine for an aircraft, the turbomachine including a combustion chamber module, and a compressor for delivering an air flow to the combustion chamber module of the turbomachine, wherein the combustion chamber module includes:
   an annular enclosure;
   a plurality of fuel injectors distributed about a combustion chamber longitudinal axis and extending inside the annular enclosure;
   an annular combustion chamber accommodated in the annular enclosure and including a chamber bottom wall of annular shape including injection systems respectively connected to the plurality of fuel injectors, and two respectively radially inner and outer walls which are coaxial and of annular shape, and which are connected to each other by the chamber bottom wall and the radially inner and outer walls including a plurality of respectively inner and outer air inlet ports, Arranged in a form of at least one annular row, such that each outer air inlet port is centered with respect to a median axial plane of a corresponding inner air inlet port, as a homologous port of the outer air inlet port,
   the combustion chamber module being configured to receive the air flow from the compressor, the air flow generally flowing from upstream to downstream of the annular combustion chamber within the annular enclosure, wherein
   a first part of the air flow is destined to penetrate the annular combustion chamber through the chamber bottom wall,
   a second part of the air flow is destined to bypass the chamber bottom wall by flowing outside the annular combustion chamber along the radially inner wall of the annular combustion chamber,
   a third part of the air flow is destined to bypass the chamber bottom wall by flowing outside the annular combustion chamber between the plurality of fuel injectors and along the radially outer wall of the annular combustion chamber,
   wherein the method comprises:
   determining wakes generated by the plurality of fuel injectors in the third part of the air flow; and
   then geometrically defining the inner and outer air inlet ports of the radially inner and outer walls of the annular combustion chamber,
   at least a plurality of outer air inlet ports located at least partly in the wakes,
   wherein each of the outer air inlet ports located at least partly in the wakes are defined to have a discharge coefficient higher than that of a corresponding one of the homologous inner air inlet ports such that an air flow rate actually entering through a respective one of the each of the outer air inlet ports which are located at least partly in the wakes is substantially equal to an air flow rate entering through the corresponding one of the homologous inner air inlet ports of the one of each of the outer air inlet ports which are located at least partly in the wakes.

2. The method according to claim 1, wherein the method comprises configuring each of the outer air inlet ports which are located at least partly in the wake of one of the plurality of fuel injectors to have a cross-section having an area higher than that of the corresponding homologous inner air inlet port of the one of each of the outer air inlet ports which are located at least partly in the wakes.

3. The method according to claim 1, wherein the method comprises configuring the inner and outer air inlet ports such that, for each of the outer air inlet ports located at least partly in the wake of one of the plurality of fuel injectors, a ratio of a discharge coefficient of the each of the outer air inlet ports located at least partly in the wakes to the discharge coefficient of a consecutive outer air inlet port located out of the wake is higher than a ratio of a discharge coefficient of the corresponding homologous inner air inlet port of the one of each of the outer air inlet ports which are located at least partly in the wakes to the discharge coefficient of the corresponding homologous inner air inlet port of the consecutive outer air inlet port located out of the wake.

4. The method according to claim 1, wherein the method comprises configuring the outer air inlet ports to form two annular rows, of primary ports and dilution ports respectively.

5. The method according to claim 1, wherein the method comprises configuring each of the outer air inlet ports, which has a discharge coefficient higher than that of the corresponding homologous inner air inlet port of the outer air inlet port, to be intersected by an axial plane passing through a fuel emitting center axis of a corresponding one of the plurality of fuel injectors.

6. The method according to claim 5, wherein the method comprises configuring the compressor to deliver to the combustion chamber module an air flow devoid of spinning component.

7. The method according to claim 1, wherein the method comprises configuring each of the outer air inlet ports, which has a discharge coefficient higher than that of the corresponding homologous inner air inlet port of the outer air inlet port, to be fully apart from an axial plane passing through a fuel emitting center axis of the corresponding one of the plurality of fuel injectors.

8. The method according to claim 1, wherein the method comprises configuring the compressor to deliver to the combustion chamber module an air flow helically flowing about the combustion chamber longitudinal axis.

* * * * *